June 20, 1950     J. W. GALLO, JR., ET AL     2,512,524
COMBINATION TRICYCLE AND BICYCLE
Filed Aug. 11, 1949     3 Sheets-Sheet 1
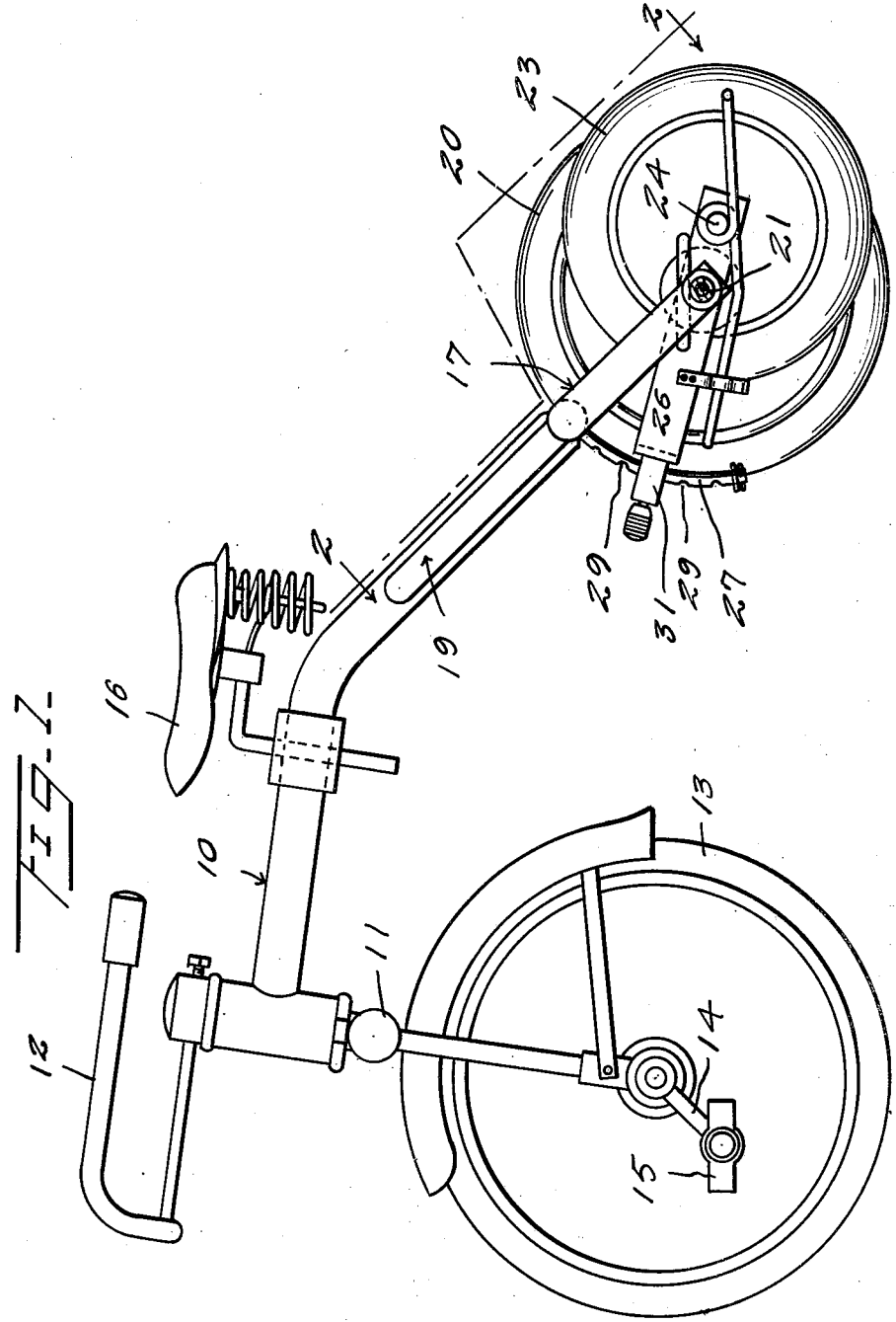
INVENTORS
John W. Gallo, Jr.
BY M. J. Gallo
Kimmel & Crowell    ATTORNEYS

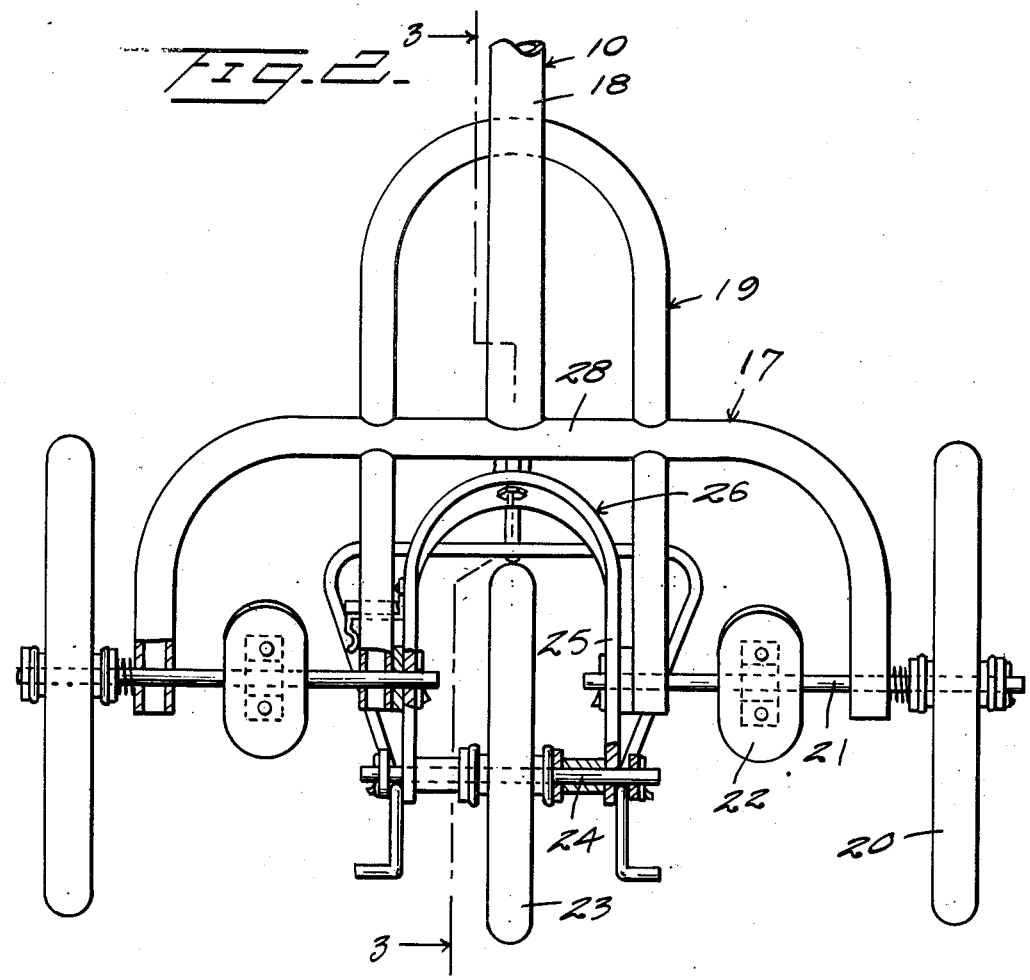

June 20, 1950
J. W. GALLO, JR., ET AL
2,512,524
COMBINATION TRICYCLE AND BICYCLE
Filed Aug. 11, 1949
3 Sheets-Sheet 3
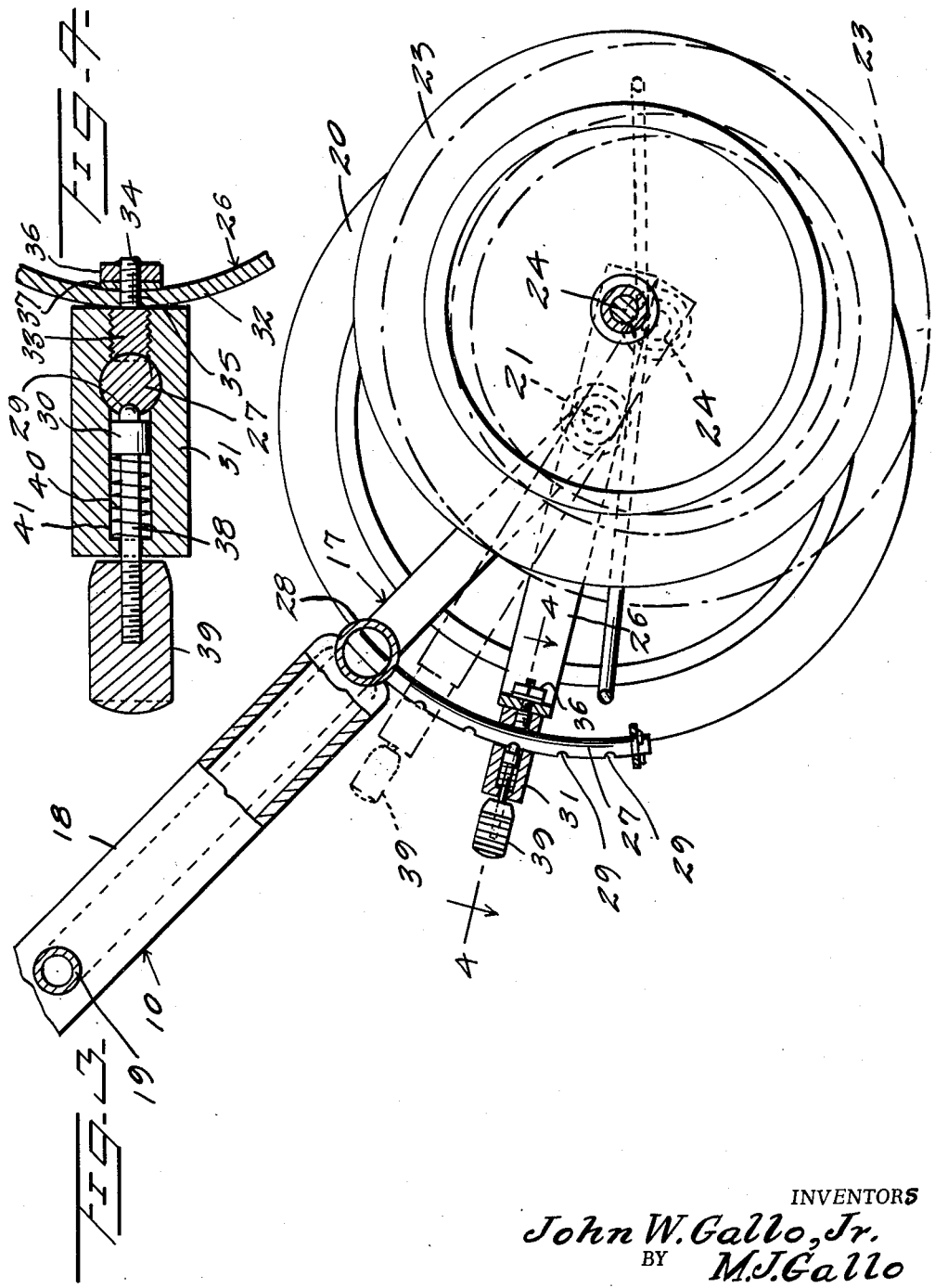
INVENTORS
John W. Gallo, Jr.
BY M. J. Gallo
Kimmel & Crowell ATTORNEYS Patented June 20, 1950

2,512,524

UNITED STATES PATENT OFFICE 2,512,524

COMBINATION TRICYCLE AND BICYCLE

John W. Gallo, Jr., and Michael J. Gallo, West Medford, Mass.

Application August 11, 1949, Serial No. 109,678

2 Claims. (Cl. 280—7.1)

This invention relates to a combination bicycle and tricycle, and is an improvement over the construction embodied in our pending application Serial No. 76,284, filed February 14, 1949, for Velocipede.

An object of this invention is to provide means for supporting the rear bicycle wheel so that this wheel can be easily and quickly lowered to operative position or raised to inoperative position.

In the carrying out of this invention, a rigid longitudinally curved latch bar is fixed in depending relation to the rear of the tricycle frame, and the rear bicycle fork has secured thereto a spring-pressed latch member adapted to adjustably lock the rear bicycle fork in adjusted position.

With the above and other objects in view, our invention consists in the arrangement, combination and details of construction disclosed in the drawings and specification, and then more particularly pointed out in the claims appended.

In the drawings,

Figure 1 is a detail side elevation of a combined bicycle and tricycle constructed according to an embodiment of this invention, Figure 2 is a fragmentary rear elevation of the device, Figure 3 is a sectional view taken on the line 3—3 of Figure 2, Figure 4 is a fragmentary sectional view taken on the line 4—4 of Figure 3.

Referring to the drawings, the numeral 10 designates generally a frame structure which has rotatably mounted on the forward end thereof a front wheel fork 11 to which is secured a handlebar 12. A front wheel 13 is rotatably carried by the fork 11 and cranks 14 are fixed relative to the wheel 13 and carry pedals 15.

The frame 10 has a seat 16 secured thereto, rearwardly from the handlebars 12, and the frame 10 includes an inverted U-shaped member 17, which is secured to the main tubular frame member 18.

A second U-shaped member 19 is secured to the U-shaped member 17 and also to the main frame member 18, and is of a width less than the width of the arms of the U-member 17. A pair of wheels 20 are rotatably carried by axles 21 which extend through the rear portions of the U-members 17 and 19, and plates or rests 22 are carried by the axles 21.

A rear bicycle wheel 23 is rockably carried by the inner portions of the axles 21, being rotatably mounted on the axle 24 extending through the arms 25 of a rear fork 26.

In order to provide a means whereby the rear bicycle wheel 23 may be vertically adjusted so that this wheel may be either raised to inoperative position above the ground or to an operative position below the horizontal plane of the tricycle wheels 20, I have provided a longitudinally curved and depending latch bar 27 which is fixed to the bight 28 of the U-member 17. The latch bar 27 is provided with spaced notches 29 and a spring-pressed latching bolt 30 is engageable in a selected one of the notches 29.

The bolt 30 is slidably carried by a block or housing 31 which is secured to the bight 32 of the bicycle fork 26. The block 31 is secured to the bight 32 by means of a threaded stud 33 which is threaded into the rear of the block 31, and the stud 33 is formed with a reduced diameter threaded stud 34 extending through an opening 35 and secured in position by means of a nut 36. A lock washer 37 is interposed between the nut 36 and the concave rear side of the bight 32. The bolt 30 includes a reduced diameter stem 38 which is slidable through the forward portion of the block 31 and a knob or handle 39 is secured to the forward end of the stem 38.

A spring 40 is disposed in a bore 41 formed in the block 31, within which the bolt 30 slidably engages and constantly urges the bolt 30 to latching position.

In the use and operation of this device, when the device is to be used as a tricycle, the rear bicycle fork 26 is rocked downwardly at its forward end by pulling the latch member or bolt 30 forwardly and swinging the block 31 with the fork 26 downwardly. When it is desired to use the device as a bicycle, the fork 26 is raised at its forward end, thereby dropping the rear end thereof and swinging the rear bicycle wheel 23 downwardly to a point below the rear tricycle wheels 20. The rear tricycle wheels 20 will provide a stabilizing or safety means for the device when used as a bicycle so that when the frame 10 is tilted to one side, one of the wheels 20 may engage the ground.

We do not mean to confine ourselves to the exact details of construction herein disclosed, but claim all variations falling within the purview of the appended claims.

What we claim is—

1. In a tricycle having a frame, a pair of rear wheels carried by the frame, and a steerable front wheel, a fork rockably carried by said frame between said rear wheels, a wheel rotatably disposed between the arms of said fork, a latch bar dependingly carried by said frame at the forward end of said fork, and spring-pressed latch means carried by said fork engaging said latch bar.

2. In a tricycle having a frame, a pair of rear wheels carried by the frame, and a steerable front wheel, a fork rockably carried by said frame between said rear wheels, a wheel rotatably disposed between the arms said fork, a longitudinally curved latch bar fixed at one end to said frame and depending therefrom, said bar having notches spaced along the convex side thereof, a latch block fixed to said fork and formed with an opening through which said latch bar loosely engages, and a spring-pressed bolt carried by said block for holding said fork in adjusted position.

JOHN W. GALLO, Jr.
MICHAEL J. GALLO.

REFERENCES CITED

The following references are of record in the file of this patent:

UNITED STATES PATENTS

| Number | Name | Date |
|---|---|---|
| 1,309,493 | Tyler | July 8, 1919 |
| 1,599,218 | Daugherty | Sept. 7, 1926 |
| 2,016,436 | Jahnke | Oct. 8, 1935 |

FOREIGN PATENTS

| Number | Country | Date |
|---|---|---|
| 641,094 | France | Apr. 10, 1928 |